United States Patent Office 3,425,934
Patented Feb. 4, 1969

3,425,934
CATALYTIC REFINING WITH HYDROGEN
Robert L. Jacobson, Pinole, and Ronald S. Tolberg, Berkeley, Calif., assignors to Chevron Research Company, a corporation of Delaware
No Drawing. Filed Feb. 23, 1965, Ser. No. 434,609
U.S. Cl. 208—254                5 Claims
Int. Cl. C10g 13/04

ABSTRACT OF THE DISCLOSURE

A sulfactive hydrogenation catalyst resistant to deactivation when sulfided is prepared by impregnating a calcined silica-alumina catalyst support having a weight ratio of $Al_2O_3$ to $SiO_2$ of between 3 and 5, a BET surface area above 300 m.$^2$/gm., an apparent bulk density below 0.6 mm./cc., and a DWT crushing strength of at least 12 pounds, with nickel and molybdenum compounds decomposable to the metal oxides on heating, in a weight ratio of $MoO_3$ to NiO of between 3 and 6, drying, and calcining at temperatures between 600 and 1,000° F. limited to avoid reducing the BET surface area below 125 m.$^2$/gm. while increasing the apparent bulk density to at least 0.6 gm./cc. The composition of this high metals content catalyst consists essentially of, in combination, from 42 to 60 weight percent alumina and from 9 to 18 weight percent silica in a weight ratio of $Al_2O_3$ to $SiO_2$ of between 3 and 5, and the balance oxides of molybdenum and nickel in a weight ratio of $MoO_3$ to NiO of between 3 and 6. The catalyst is used in a hydroconversion process at relatively lower hydrogen pressures.

---

The invention relates to processes for the catalytic refining of hydrocarbon oils with hydrogen and to catalysts used therein, for example, for sulfur removal, nitrogen removal, and aromatics hydrogenation. More particularly the invention relates to processes and catalysts for converting organic nitrogen compounds contained in hydrocarbon oils to ammonia.

It is frequently desired to purify hydrocarbon oils derived from crude petroleum and similar hydrocarbonaceous materials, especially to remove nitrogen compounds. For example, catalytic hydrorefining is used to prepare naphtha for reforming with catalysts the activities of which are adversely affected by nitrogen compounds. Also, for example, catalytic hydrorefining is used to prepare gas oils for hydrocracking, to prepare residua or deasphalted residua for catalytic cracking, and to prepare improved lubricating oils.

The catalytic hydrorefining processes may be carried out in a variety of manners adapted to effect intimate contacting of oil, hydrogen, and a solid catalyst in a reaction zone, by passing the oil and hydrogen together or countercurrently through beds of catalysts particles, or by passing the oil and hydrogen through a zone wherein they contact downwardly gravitating catalyst particles, suspended catalyst particles, or fluidized catalyst particles. Conditions employed in the reaction zone include temperatures of 500–900° F., pressures of 200–10,000 p.s.i.g., hydrogen to oil ratios of 500–20,000 standard cubic feet per barrel, and contact times between catalyst and oil expressed in liquid volumes of oil per hour per volume of catalyst of 0.2–10 LHSV. Sulfactive hydrogenation catalysts are used, comprising Group VI metals and Group VIII metals, their oxides or sulfides, usually associated with a porous refractory oxide carrier or support.

The activity of catalysts heretofore used declines with time during use at a rate dependent on the temperature and pressure conditions employed, the rate of catalyst deactivation being particularly dependent on hydrogen partial pressure. It is desirable to carry out the process for many thousands of hours continuously without catalyst regeneration, which has dictated the use of high pressure and high purity hydrogen. Specifically, for the hydrodenitrification of naphtha produced from cracking operations with the best catalysts heretofore available, it has been necessary to provide a hydrogen partial pressure of at least about 400 p.s.i.a., usually about 450 p.s.i.a. obtained with high purity hydrogen at a pressure of about 500 p.s.i.g. The rate of catalyst activity decline increases rapidly as the hydrogen partial pressure is lowered below 400 p.s.i.a., and and is surprisingly much more rapid at low partial pressures of 300 p.s.i.a. than would be expected based on the effect of hydrogen partial pressure on the rate of catalyst deactivation at higher pressures. The foregoing remarks apply particularly where the process objective is to remove nitrogen compounds virtually completely from the oil undergoing treatment. References in the prior art to hydrorefining at low pressures in the neighborhood of 200 p.s.i. relate only to mild hydrofinishing operations carried out at low temperatures of below about 600 °F., with little nitrogen conversion, or to treatment of virgin stocks which contain very little nitrogen, or to processes wherein only a very short onstream time is permitted between catalyst regenerations.

The present invention provides an improved process for continuously purifying hydrocarbon oils by conversion of nitrogen compounds to ammonia characterized by the use of relatively lower hydrogen partial pressures than could previously be used with a long on-stream time between catalyst regenerations. In a particular embodiment the invention provides an improved process for continuously purifying naphtha for catalytic reforming wherein there is used certain new catalysts at low hydrogen partial pressures and/or with hydrogen gas of low purity. In accordance with the invention there is employed a sulfactive hydrogenation catalyst comprising nickel, molybdenum, alumina, and silica, which is characterized when sulfided by resistance to deactivation at low hydrogen partial pressures and by resistance to deactivation in contact with high boiling or refractory feed stocks. Because of the slower rate of catalyst deactivation, oils can be hydrotreated with the catalyst for desired long onstream times of at least 2,000 operating hours without catalyst regeneration and until at least 1000 barrels of oil have been hydrotreated per barrel of catalyst, at lower hydrogen partial pressures than heretofore could be used with conventional catalysts. The invention can also provide superior operation at high pressure conditions to denitrify heavier and more refractory stocks than can be processed with presently available catalysts at reasonable operating pressures.

The sulfactive hydrogenation catalysts of this invention, characterized by resistance to deactivation at low hydrogen partial pressure when sulfided, consist essentially of, in combination, from 42 to 60 weight percent alumina and from 9 to 18 weight percent silica in a weight ratio of $Al_2O_3$ to $SiO_2$ of between 3 and 5, and the balance oxides of molybdenum and nickel in a weight ratio of $MoO_3$ to NiO of between 3 and 6. The catalyst is provided in the form of porous thermally-stable particles having a nitrogen surface area above 125 and preferably of at least 150 square meters per gram (BET), an apparent bulk density of at least 0.6 gram per cc., and a dead weight test crushing strength (DWT) of at least 10 pounds. The catalyst is most suitably prepared by impregnating a calcined silica-alumina catalyst support having a weight ratio of $Al_2O_3$ to $SiO_2$ of between 3 and 5, a BET surface area above 300 square meters per gram, an apparent bulk density below 0.6 gram per cc., a pore volume above 0.6 cc./gm., and a DWT crushing strength of at least 12 pounds, with nickel and molybdenum compounds decomposable to the metal oxides on heating, in a weight ratio of $MoO_3$ to $NiO$ of between 3 and 6, drying, and calcining at temperatures between 600° F. and 1000° F. limited to avoid reducing the BET surface area below 125 square meters per gram while increasing the apparent bulk density to at least 0.6 gram per cc. The metal oxides are converted to the sulfides before or during startup of the process in which the catalyst is used.

Catalysts of the above description and prepared in this manner are characterized when sulfided by a deactivation rate below 0.05° F. per hour at a hydrogen partial pressure of 300 p.s.i.a. in a standard naphtha denitrification test. The standard naphtha denitrification test comprises passing a mixture of cracked and straight run nitrogen-containing naphthas, boiling between about 200° F. and 400° F., with 3000 standard cubic feet of hydrogen per barrel providing a hydrogen partial pressure of 300 p.s.i.a., into contact with the sulfided catalyst at a space velocity of 3 LHSV at the temperature required to convert 99.9% of the nitrogen initially contained in the naphtha to ammonia. The rate at which the temperature must be increased, in ° F. per hour, to continue obtaining 99.9% nitrogen conversion, is the catalyst deactivation rate. The standard naphtha feed employed to obtain data presented herein had a gravity of 46.2° API, aniline point of 82° F., sulfur content of 0.75 weight percent, nitrogen content of 273 p.p.m., an initial boiling point of 186° F., and an end boiling point of 413° F., 90% of the naphtha boiling from 231° F. to 385° F.

The following tabulation summarizes for comparison purposes certain physical properties and deactivation rate data for catalysts used in the prior art (A and F) and for experimental catalysts (B, C, D and E), of which catalyst B is an exemplary catalyst within the present invention. Further information regarding these and other catalysts, including relative activities and other properties and methods of preparation, is presented in greater detail in the examples and description hereinafter.

TABLE I

| Catalyst | Commercial A | Experimental | | | | Commercial F |
|---|---|---|---|---|---|---|
| | | B | C | D | E | |
| Weight percent $SiO_2$ | Nil | 11.1 | 7.5 | 11.5 | 3.8 | 3.5 |
| Weight ratio, $Al_2O_3/SiO_2$ | >100 | 4.55 | 7.35 | 5.1 | 15.7 | 21.4 |
| Weight ratio, $MoO_3/NiO$ | 3.75 | 4.2 | 3.3 | 3 | 3.5 | 3.45 |
| BET area, m.$^2$/g | 110 | 199 | 226 | 108 | 214 | 249 |
| Density (ABD), g./cc | 0.82 | 0.74 | 0.64 | 0.95 | 0.66 | 0.62 |
| Pore volume, cc./g | 0.38 | 0.44 | 0.60 | | 0.61 | 0.68 |
| DWT strength, lbs | 12–15 | 19 | | | 11.6 | |
| Deactivation rate, ° F./hr. (naphtha at 300 p.s.i.a.) | 0.27 | 0.02 | 0.04 | 0.08 | 0.3 | 0.25 |

Example 1

When the standard naphtha denitrification test was applied to a commercial highly-active nickel-molybdenum-alumina catalyst composed of 30% $MoO_3$ and 8% $NiO$ supported on alumina (Catalyst A) to measure the deactivation rate of 0.27° F. per hour at 300 p.s.i.a. hydrogen partial pressure and 3 LHSV, a starting temperature of 670° F. was needed to obtain a naphtha product containing 0.3 p.p.m. organic nitrogen from the standard naphtha feed. Continuous operation of a naphtha hydrotreating process at these conditions would be impractical with this catalyst because of the rapid activity loss. Ordinarily, the catalyst is used at a hydrogen partial pressure of 470 p.s.i.a., at which conditions the deactivation rate is sufficiently low for continuous commercial operation.

The following example illustrates the greater resistance to deactivation at low hydrogen partial pressures of a catalyst within the present invention.

Example 2

Catalyst B was prepared using a calcined alumina-silica catalyst support composed of 18% silica and 82% alumina, a weight ratio of $Al_2O_3$ to $SiO_2$ of 4.55 having a BET surface area of about 420 square meters per gram, an apparent bulk density of 0.49 gram per cc., a pore volume of 0.80 cc. per gram, and a DWT crushing strength of 12.7 pounds. This support was impregnated with an aqueous solution of nickel nitrate, dried and calcined, and then with an aqueous solution of ammonium molybdate, dried and calcined, in proportions such that the finished catalyst analyzed 50.4 weight percent $Al_2O_3$, 11.1 weight percent $SiO_2$, the balance $MoO_3$ and $NiO$ in a weight ratio of 4.25 (29.5% $MoO_3$ and 7.0% $NiO$. When the catalyst was sulfided and then subjected to the standard naphtha denitrification test at 300 p.s.i.a. hydrogen partial pressure and 3 LHSV, using the above described 46.2° API naphtha feed, the deactivation rate was less than 0.02° F. per hour. Thus, this catalyst has a deactivation rate at low hydrogen partial pressures which is less than one-tenth the deactivation rate of the highly active nickel-molybdenum-alumina Catalyst A. Accordingly, naphtha hydrotreating could be carried out continuously with the new Catalyst B at a hydrogen partial pressure of 300 p.s.i.a. for at least 2000 hours and until at least 1000 barrels of naphtha have been purified per barrel of catalyst employed.

In part, the slower deactivation rate can be attributed to the fact that the Catalyst B prepared on the alumina-silica support accomplished the 99.9% conversion at a starting temperature of 652° F., as compared to 670° F. with the alumina-supported Catalyst A. This small temperature difference, however, does not explain the unusual resistance to deactivation of the new catalysts, as shown by the following example of a still more active catalyst which, however, has a higher deactivation rate.

Example 3

Catalst C was prepared on a support composed of alumina and silica in a weight ratio of $Al_2O_3$ to $SiO_2$ of 7.35 (12% $SiO_2$) by impregnating with nickel nitrate and ammonium molybdate in the same manner as in Example 2, obtaining a finished catalyst containing 55% $Al_2O_3$, 7.5% $SiO_2$, 28.5% $MoO_3$, and 9% $NiO$. When sulfided and tested in the standard naphtha denitrification test, this catalyst exhibited a lower starting temperature of 642° F., but had a deactivation rate of 0.04° F. per hour at 300 p.s.i.a. and 3 LHSV, more than twice as rapid as Catalyst B.

It has been proposed in the past to combine nickel and molybdenum with silica-alumina in catalysts for denitrification. Heretofore, however, the components have not been used in the proportions and amounts used in the new catalysts of this invention. In particular, prior art catalysts have used either too much silica, or too much alumina, or insufficient amounts of nickel and molybdenum. Moreover, it is found that to provide a useful catalyst exhibiting the unusual resistance to deactivation at low hydrogen partial pressures, the catalysts of this invention must have certain physical properties. achieved by careful control in the catalyst manufacture. Specifically, the active and stable catalysts are characterized by high surface area of above 125 square meters per gram, apparent bulk density of at least 0.6 gram per cc., and pore volume below 0.6 cc. per gram. The obtaining of such properties in a catalyst of adequate crushing strength above 10 pounds requires careful selection and preparation of the alumina-silica carrier, and careful handling in the impregnation and calcining procedures.

The alumina-silica carrier may be prepared by a variety of procedures well known in the art, modified to produce a calcined composite with a weight ratio of $Al_2O_3$ to $SiO_2$ of between 3 and 5, having a BET surface area below 300 square meters per gram, an apparent bulk density below 0.6 gram per cc. and a DWT crushing strength of at least 12 pounds. More desirably, the BET surface area is above 370 square meters per gram, and the apparent bulk density is no more than about 0.5 gram per cc. The combination of these properties will provide a material having a pore volume between about 0.75 and 1.15 cc. per gram, with the more desirable range of pore volumes being near 1 cc. per gram, e.g., from 0.8 to 1.0.

The carrier may be prepared by cogelation or coprecipitation techniques known in the art, such as those described in Reeves et al. U.S. Patent No. 2,348,647, or by more recent techniques. In one suitable method, coprecipitation is carried out in two steps or stages wherein sodium silicate, sodium aluminate, and aluminum sulfate are combined and partially coprecipitated, and then additional alumina is precipitated by adjustment of the pH of the mixture. The precipitate is then partially dried, washed to remove sodium and sulfate ions, dried to extrudable consistency, and further dried and calcined after extrusion. As an alternative, instead of extruding, the material may be dried as a powder and then pelleted. Desirably the final calcining should be at a temperature not substantially in excess of 1000° F., and preferably in the neighborhood of 900° F., to maintain the high surface area, low density, and high pore volume desirable in the material to be impregnated.

Inferior results are obtained if the preparation of the support is not in accordance with the above features, as shown by the following example.

Example 4

Catalyst D was prepared by impregnating high surface area calcined alumina with ethyl orthosilicate sufficient to provide a carrier, after washing, drying, and calcining, having an $Al_2O_3$ to $SiO_2$ ratio of 5.1. This material was then impregnated with nickel nitrate and ammonium molybdate in the manner previously described in Example 2, providing a finished catalyst containing 58.5% $Al_2O_3$, 11.5% $SiO_2$, 22.5% $MoO_3$, and 7.5% NiO. The finished Catalyst D had a BET surface area of only 108 square meters per gram and an apparent bulk density of 0.95 gram per cc. In the standard naphtha denitrification test at 300 p.s.i.a. previously described, the catalyst had a deactivation rate of 0.08° F./hr. Thus, the catalyst declines in activity at a rate which is more than 4 times as fast as Catalyst B of Example 2, even though the catalysts have very nearly the same composition.

The specification of certain properties for the support material is predicated in large measure on the need for related properties in the finished catalyst, in view of the method of preparation used. In particular, it is found that a high BET surface area improves the resistance to deactivation.

Example 5

Nickel-molybdenum-alumina hydrofining catalysts were prepared of identical composition by the same procedure using alumina supports of different BET area, to provide finished catalysts having different BET surface areas of 110 square meters per gram and 133 square meters per gram. The catalysts were then tested in the denitrification of heavy California gas oil, boiling from about 600° F. to 900° F., at 2000 p.s.i.g. and and 0.5 LHSV at the temperatures required for virtually complete denitrification. The deactivation rates of the catalysts were compared with that of a catalyst prepared in accordance with the present invention with a BET surface area of 256 square meters per gram in denitrifying the heavy gas oil, with the following results.

TABLE II

|  | Support | | |
| --- | --- | --- | --- |
|  | Alumina | Alumina | Alumina-silica |
| BET area, m.²/g | 240 | 295 | 397 |
| ABD, g./cc | 0.5 | 0.55 | 0.42 |
| Pore volume, cc./g | 0.75 | 0.74 | 0.98 |
| Catalyst: | | | |
| Weight percent $SiO_2$ | | | 13.3 |
| Weight percent $Al_2O_3$ | 58 | 60 | 53.2 |
| Weight percent $MoO_3$ | 34 | 33 | 27.3 |
| Weight percent NiO | 8 | 7.5 | 6.2 |
| BET area, m.²/g | 110 | 133 | 256 |
| ABD, g./cc | 0.82 | 0.88 | 0.65 |
| Pore volume, cc./g | 0.38 | 0.32 | 0.56 |
| Deactivation rate, ° F./hr. (heavy gas oil at 2,000 p.s.i.) | 0.1 | 0.04 | ¹ 0.01 |

¹ Approximately.

Thus, the catalysts of this invention are characterized by resistance to deactivation during hydrotreating high boiling refractory oils, when the BET surface area is at least 150 square meters per gram. The obtaining of such a high surface area requires that the carrier or support have a substantially higher surface area prior to impregnation. As mentioned, it is accordingly specified that the alumina-silica carrier have a surface area of at least 300 square meters per gram, and preferably greater than 370 square meters per gram.

It is important to control the calcination temperatures after impregnation with nickel and molybdenum in order to avoid losing the high surface area advantage of the support, as shown by the following. When a catalyst having the composition of Catalyst B was calcined at 800° F., the final surface area was 210 m.²/gm.; when calcined at 900° F., the final surface area was 160 m.²/gm. This indicates a surprisingly large dependence of surface area on calcining temperature in a low temperature range where the surface area of other supports such as alumina is relatively insensitive to calcining temperature. As already shown, the deactivation rate increases as surface area is decreased. Thus, calcination should be controlled in the range 600–1000° F., and preferably 600–900° F., especially 700–850° F., to avoid reducing the surface area below 150 m.²/gm. The catalyst can safely be exposed to temperatures as high as 1000° F. for only a short time. This applies to both calcinations, but especially the final calcination, if nickel and molybdenum are separately impregnated.

Calcination temperature also is important as affecting activity and resistance to deactivation, further indicating the relationship of surface area to these essential properties and how such properties can be regulated in accordance with the invention. The following data shows the effects of calcinations for four hours at different temperatures on the relative hydrogenation activity of a catalyst, prepared in accordance with the present invention.

TABLE III

| Calcination temperature° F.: 4 hours at | Relative hydrogenation activity |
| --- | --- |
| 800 | 148 |
| 900 | 164 |
| 950 | 149 |

As shown, maximum activity is obtained at a calcination temperature of about 900° F., but activity can drop off rapidly at only slightly higher temperature. Consequently, is is preferred to specify calcination at a temperature below 900° F. so as to insure not exceeding 900° F. for more than a short time.

The presence of silica in the carrier helps provide a high surface area, as shown by the following example.

Example 6

Catalyst E was prepared in the same manner of Catalyst C of Example 3 except using an alumina-silica carrier of lower silica content, which resulted in a final surface area of 214 square meters per gram as compared to 226 square meters per gram for Catalyst C. Specifically, Catalyst E contains 60 weight percent $Al_2O_3$ and 3.8 weight percent $SiO_2$, a weight ratio of $Al_2O_3$ to $SiO_2$ of 15.7, the balance being 28 weight percent $MoO_3$ and 8 weight percent NiO. Surface area is not the entire answer, however, nor is silica content, as a high area can be obtained even with a low silica content. This is illustrated by a known commercial catalyst (F) containing 75% $Al_2O_3$ and 3.5% $SiO_2$, a weight ratio of $Al_2O_3$ to $SiO_2$ of 21.4, the balance being 16.5 weight percent $MoO_3$, 4.8 weight percent NiO, and a small amount of cobalt. This catalyst (F) typically has a BET surface area of 249 square meters per gram. In the standard naphtha denitrification test at 300 p.s.i.g. hydrogen partial pressure, however, Catalyst E and the higher surface area Catalyst F declined in activity at essentially the same high rate, which is also substantially the same as the deactivation rate of the lower surface area Catalyst A described previously, as shown in Table I hereinbefore. Both Catalyst E and Catalyst A are significantly more active than Catalyst F, which higher activity appears to be the principal contribution of the higher metal contents.

The high concentrations of nickel and molybdenum desired in the catalysts of this invention are also employed to provide a high apparent bulk density of at least 0.6 gram per cc. in the finished catalyst. More desirably, the apparent bulk density is at least 0.7 gram per cc. and may range upwards of 1.0 gram per cc. It is found particularly advantageous that the high bulk density is obtained by means of impregnation with high nickel and molybdenum contents rather than by starting with a carrier of high bulk density since the provision of the desired high BET surface area will result in inordinately low pore volumes unless a low density support is provided. Hence, as mentioned, it is desired that the apparent bulk density of the alumina-silica carrier be less than 0.6 gram per cc., and more desirably not in excess of about 0.5 gram per cc. so as to provide the desired large pore volumes of close to 1 cc. per gram. It is found that the optimum combination of area and bulk density providing a low deactivation rate is obtained at certain optimum silica contents in the finished catalysts, which optimum silica contents are provided by the use of a narrow range of alumina to silica ratios in combination with high concentrations of nickel and molybdenum.

The effect of metal content (nickel and molybdenum) on silica concentration and activity is further indicated by the following data showing the temperature required to convert to $NH_3$ all but 0.3 p.p.m. of nitrogen in a heavy gas oil with catalysts of different metal contents at otherwise identical process conditions.

TABLE IV

| | | | | |
|---|---|---|---|---|
| Weight percent $SiO_2$ | 16.9 | 13.7 | 11.7 | 13.7 |
| Weight Ratio $Al_2O_3/SiO_2$ | 4 | 4 | 4 | 4 |
| Weight percent NiO plus $MoO_3$ | 15.5 | 31.6 | 41.6 | 31.7 |
| Weight ratio $MoO_3/NiO$ | 3.8 | 3.8 | 2.8 | 5.6 |
| Temperature required, °F. (Heavy Gas Oil at 2,000 p.s.i.) | 773 | 756 | 753 | 749 |

As can be seen, activity increases as Ni and Mo content are increased, but the major advantage is obtained when the total metal content is sufficient to provide a silica content below about 15 weight percent at the preferred $Al_2O_3$ to $SiO_2$ ratio, further increases in metal content giving little improvement.

Specifically, it is found that optimum stability in terms of resistance to deactivation at low hydrogen partial pressures is obtained at $SiO_2$ concentrations in the range 9–18 weight percent where the ratio of $Al_2O_3$ to $SiO_2$ is between 3 and 5, especially about 4, the low $SiO_2$ concentration being achieved by using high concentrations of nickel and molybdenum. It is found that the hydrocracking activity of the catalysts increases significantly at $Al_2O_3/SiO_2$ ratios below about 3. High hydrocracking activity is not particularly desired in the catalysts which are to be used in accordance with the invention primarily for the hydroconversion of organic nitrogen compounds to purify oils rather than to convert them to lower boiling products. Some hydrocracking will inherently accompany this conversion, and may be desirable when heavy oils are being treated, but such is not the primary purpose of the process. In particular, it is to be noted that the deactivation rate is defined in terms relative to the conversion of nitrogen compounds where such compounds are being nearly completely eliminated. In a process wherein the nitrogen content of the product is not a critical variable, this deactivation rate has little significance and the operation of the process becomes instead dependent on the rate of catalyst activity declined for promoting some other reaction.

The most desirable silica concentration in the finished catalyst appear to be in the range from about 11% to about 13%. Thus, with the maximum permitted alumina concentration of 60 weight percent the $Al_2O_3/SiO_2$ ratio should be near 5, whereas at the lower permitted alumina concentration of 42 weight percent the $Al_2O_3/SiO_2$ ratio should be near 3.

The adverse effects on deactivation rate of using $Al_2O_3/SiO_2$ ratios greater than 5 has already been demonstrated by the examples previously presented. The use of $Al_2O_3/SiO_2$ ratios of below 3 appears attractive in some cases but is found to be generally impractical. For a commercially useful catalyst it is necessary that the catalyst particles exhibit good strength and resistance to attrition else the reactor and associated equipment may become plugged with catalyst fines or attrited powder. It is therefore specified that the finished catalysts have a crushing strength determined by the dead weight test method of at least 10 pounds. This in turn requires that the alumina-silica carrier have a substantially higher crushing strength of at least 12 pounds as the impregnation and calcining procedures often result in weakening of the particles. It is found that the higher the silica content of the alumina-silica carrier the weaker the formed catalyst particles tend to be. While this situation may be corrected by use of elevated calcining temperatures and high pressure pelleting procedures, these methods result in lowering the BET surface area below the desired high values. For example, an alumina-silica carrier with an $Al_2O_3$ to $SiO_2$ weight ratio of 2.34 was so fragile that when impregnated with molybdenum and nickel to provide a finished catalyst containing 28% $MoO_3$ and 8 weight per cent $NiO_2$ more than 10% of the catalyst was lost by attrition during handling.

Also, it is found that higher silica contents relative to alumina are associated with lower surface area stability. This is illustrated by the following data showing the per cent of surface area loss caused by heating nickel-molybdenum-alumina-silica catalysts of different silica contents for 4 hours with steam at 900° F. and atmospheric pressure.

TABLE V

| Wt. ratio $Al_2O_3/SiO_2$: | Percent area loss |
|---|---|
| >100 | 8 |
| 2.6 | 19 |
| 0.85 | 58 |

Thus, area loss is substantial at alumina-to-silica weight ratios below about 3 at moderate temperature of only 900° F., which is a situation which could readily occur in ordinary catalyst regeneration procedures using steam.

Another factor which must be considered in addition to the catalyst deactivation rate is catalyst regenerability. It is found that in many cases a catalyst may be regenerable in the sense of restoring its initial activity after use, by combustion of carbonaceous deposits laid down on the catalyst, but the catalysts are not always regenerable with respect to deactivation rate. That is, it is surprisingly found that after use in hydrorefining processes wherein a catalyst exhibits a satisfactory low deactivation rate, upon regeneration the catalyst may exhibit a higher deactivation rate when next used. This is frequently a drawback of highly active catalysts. For example, an unusually active catalyst of lower silica content than specified for catalysts of this invention was prepared by a gelation technique to obtain the following composition: 49.5% $Al_2O_3$, 5% $SiO_2$, 34.5% $MoO_3$, and 11% NiO. This catalyst had a BET surface area of 338 square meters per gram and an apparent bulk density of 0.95 gram per cc. It had a very low deactivation rate in the standard naphtha denitrification test at 300 p.s.i.a. hydrogen partial pressure. However, when used until deactivated and then regenerated by the best known procedures, the deactivation rate in subsequent use was found to be twice the deactivation rate of the fresh catalyst. In contrast, Catalyst B of Example 2 showed substantially the same low deactivation rate and the same high activity after use and regeneration as it had when fresh.

While the invention has been described herein particularly with reference to naphtha denitrification, it should be clear that the invention also relates to processes for hydrorefining of heavier, higher boiling, and highly contaminated oils. The same advantages of high activity and lower deactivation rate at relatively lower hydrogen partial pressures are still observed. For example, a heavy California gas oil boiling from about 600° F. to 825° F. and containing over 2000 p.p.m. nitrogen was purified to obtain a product oil containing only 0.3 p.p.m. nitrogen by contacting with the prior art Catalyst A, but even at a hydrogen partial pressure of 1600 p.s.i.a. the catalyst deactivation rate was 0.1° F. per hour. With the catalyst of this invention as exemplified by Catalyst B, the purification was accomplished at a higher temperature at substantially lower hydrogen partial pressure of 1400 p.s.i.a., and yet the catalyst deactivation rate was substantially less, namely 0.03° F. per hour. After this use and regeneration, activity and deactivation rate of Catalyst B were substantially unchanged. Thus, the use of the nickel-molybdenum-alumina-silica catalysts of this invention provides an economic feasible process operable at lower hydrogen partial pressure as compared to the technically operable but economically impractical process using the prior art catalysts.

In one embodiment of this invention the slower rate of deactivation of the catalysts is utilized to make possible operation with hydrogen of lower purity. Thus, for example, naphtha can be purified by converting organic nitrogen compounds contained therein to $NH_3$ to provide a continuous stream of essentially nitrogen-free naphtha for catalytic reforming by passing the naphtha and gas comprising from 40 to 70 mol percent hydrogen through a reaction zone containing the sulfided catalyst. At temperatures in the range 500–900° F. and total pressures in the range 300–1000 p.s.i.g., the proportions of naphtha and gas and the hydrogen content of the gas are controlled to maintain a lower hydrogen partial pressure in the reaction zone between 200 and 400 p.s.i.a. Hydrogen available as a byproduct not heretofore usable for hydrogenation can be employed. For example, byproduct hydrogen from the dehydrogenation of light hydrocarbons such as butane typically has a low purity of about 50% $H_2$. Because a low hydrogen partial pressure can be used, such low purity hydrogen can be employed for the naphtha denitrification at the same total reactor pressure normally employed with higher purity hydrogen.

In prior art hydrogen treating processes, purging of a portion of the recycle hydrogen is usually practiced to control recycle hydrogen purity by limiting the buildup in concentration of light byproducts, including methane. In the present invention, regardless of the purity of makeup hydrogen provided, hydrogen losses may be minimized by restricting purging of recycle gas, permitting the light hydrocarbon byproducts to increase to concentrations where the net production is essentially removed by solution in oil separated from hydrogen-rich recycle gas.

Similarly, low purity hydrogen can be used in the hydrotreating of high boiling oils for nitrogen removal at higher pressures. Generally, however, it is then preferred to design for a lower total pressure and to use hydrogen of normal purity because the cost of equipment for treating high boiling oils increases rapidly with increasing design total pressure. Thus, in hydrotreating processes ordinarily carried out at temperatures 500–900° F. and pressures of 300–10,000 p.s.i.g., improved results can be obtained in accordance with the present invention by carrying out the hydrotreating at relatively lower pressures of 200–4,000 p.s.i.g.

We claim:
1. A catalyst consisting essentially of, in combination, from 42 to 60 weight percent alumina and from 9 to 18 weight percent silica in a weight ratio of $Al_2O_3$ to $SiO_2$ of between 3 and 5, and the balance oxides of molybdenum and nickel in a weight ratio of $MoO_3$ to NiO of between 3 and 6, and wherein the catalyst is prepared by impregnating a silica-alumina catalyst support, having an apparent bulk density below 0.6 gm./cc., with nickel and molybdenum compounds decomposable to the metal oxides on heating.

2. A sulfactive hydrogenation catalyst resistant to deactivation when sulfided, consisting essentially of, in combination, from 42 to 60 weight percent alumina and from 9 to 18 weight percent silica in a weight ratio of $Al_2O_3$ to $SiO_2$ of between 3 and 5, and the balance oxides of molybdenum and nickel in a weight ratio of $MoO_3$ to NiO of between 3 and 6, prepared by impregnating a calcined silica-alumina catalyst support having a weight ratio of $Al_2O_3$ to $SiO_2$ of between 3 and 5, a BET surface area above 300 $m.^2$/gm., an apparent bulk density below 0.6 gm./cc., and a DWT crushing strength of at least 12 pounds, with nickel and molybdenum compounds decomposable to the metal oxides on heating, in a weight ratio of $MoO_3$ to NiO of between 3 and 6, drying, and calcining at temperatures between 600 and 1,000° F. limited to avoid reducing the BET surface area below 125 $m.^2$/gm. while increasing the apparent bulk density to at least 0.6 gm./cc.

3. The catalyst of claim 2 wherein the weight ratio of $Al_2O_3$ to $SiO_2$ is approximately 4.

4. A process for continuous catalytic hydrotreating of hydrocarbon oils at relatively low hydrogen partial pressure, which comprises passing hydrocarbon oil and hydrogen-containing gas through a reaction zone containing as the effective catalytic agent a sulfided catalyst which before sulfiding consists essentially of, in combination, from 42 to 60 weight percent alumina and from 9 to 18 weight percent silica in a weight ratio of $Al_2O_3$ to $SiO_2$ of between 3 and 5, and the balance oxides of molybdenum and nickel in a weight ratio of $MoO_3$ to NiO of between 3 and 6, and wherein the catalyst is prepared by impregnating a silica-alumina catalyst support, having an apparent bulk density below 0.6 gm./cc., with nickel and molybdenum compounds decomposable to the metal oxides on heating, at elevated temperature of 500–900° F. and total pressure of 300–10,000 p.s.i.g., controlling the relative amounts of oil and gas and the hydrogen content of the gas to maintain a relatively lower hydrogen partial pressure of 200–4,000 p.s.i.a., recovering hydrogen-treated oil from the reaction zone effluent, and continuing so passing oil and gas for at least 2,000 operating hours without catalyst regeneration and until at least 1,000 barrels of oil has been hydrotreated per barrel of said catalyst contained in said reaction zone.

5. A process for purifying naphtha by converting organic nitrogen compounds contained in the naphtha to $NH_3$ to provide a continuous stream of essentially nitrogen-free naphtha for catalytic reforming, which comprises: passing naphtha and gas comprising from 40 to 70 mol percent $H_2$ through a reaction zone containing as the effective catalytic agent a sulfided catalyst consisting essentially of sulfides of nickel and molybdenum and oxides of silicon and aluminum in the proportions by weight, before sulfiding, of from 42 to 60 weight percent $Al_2O_3$ and 9-18 weight percent $SiO_2$ in a weight ratio of $Al_2O_3$ to $SiO_2$ of between 3 and 5, and the balance oxides of molybdenum and nickel in a weight ratio of $MoO_3$ to $NiO$ of from 3 to 6, and wherein the catalyst is prepared by impregnating a silica-alumina catalyst support, having an apparent bulk density below 0.6 gm./cc., with nickel and molybdenum compounds decomposable to the metal oxides on heating, at temperatures in the range 500-900° F. and pressures in the range 300-1,000 p.s.i.g., controlling the proportions of naphtha and gas and the hydrogen content of the gas to maintain the hydrogen partial pressure in the reaction zone between 200 and 400 p.s.i.a., recovering essentially nitrogen-free naphtha from the reaction zone effluent, and continuing so passing naphtha and gas for at least 2,000 hours and until at least 1,000 barrels of nitrogen-free naphtha has been produced per barrel of said catalyst contained in said reaction zone.

References Cited

UNITED STATES PATENTS

| | | | |
|---|---|---|---|
| 3,004,913 | 10/1961 | Tucker | 208—254 |
| 3,016,348 | 1/1962 | Holden | 208—254 |
| 3,248,318 | 4/1966 | White | 208—254 |
| 3,254,018 | 5/1966 | Watkins | 208—254 |

DELBERT E. GANTZ, *Primary Examiner.*

G. J. CRASANAKIS, *Assistant Examiner.*

U.S. Cl. X.R.

208—216, 217; 252—458, 459